United States Patent
Wilson et al.

(10) Patent No.: US 6,253,869 B1
(45) Date of Patent: Jul. 3, 2001

(54) STOW-AWAY VEHICLE TRANSMISSION SHIFT SYSTEM

(75) Inventors: James J. Wilson, Allentown; Neal W. Biser, Coopersburg; Lonnie K. Kresge, Lehighton; John Patrick Petraglia, Jr., Bethleham, all of PA (US)

(73) Assignee: Mack Trucks, Inc., Allentown, PA (US)

( * ) Notice: Subject to any disclaimer, the term of this patent is extended or adjusted under 35 U.S.C. 154(b) by 0 days.

(21) Appl. No.: 09/492,160

(22) Filed: Jan. 27, 2000

Related U.S. Application Data

(60) Provisional application No. 60/119,249, filed on Feb. 9, 1999.

(51) Int. Cl.[7] .............................. F16H 59/02; A47C 7/62
(52) U.S. Cl. ..................... 180/326; 74/473.3; 297/217.1; 297/411.31
(58) Field of Search ................. 74/473.1, 473.3; 180/326, 336; 297/217.1, 411.31

(56) References Cited

U.S. PATENT DOCUMENTS

| | | | |
|---|---|---|---|
| 4,695,096 | * | 9/1987 | Kincaid ........................... 297/411.31 |
| 4,732,232 | * | 3/1988 | Miyagi et al. ....................... 180/336 |
| 5,617,929 | * | 4/1997 | Richardson et al. .................. 180/326 |
| 6,065,560 | * | 5/2000 | Palmeri et al. ...................... 180/326 |

FOREIGN PATENT DOCUMENTS

0911548 * 4/1999 (EP) .

* cited by examiner

*Primary Examiner*—Allan D. Herrmann
(74) *Attorney, Agent, or Firm*—Rothwell, Figg, Ernst & Manbeck

(57) ABSTRACT

A stow-away vehicle transmission shift system adapted to be pivotally attached to a drivers seat of said vehicle is provided according to the invention. The stow-away vehicle transmission shift system includes an axle affixed to the drivers seat, a swing arm having an upper end and a lower end, with the lower end being pivotally attached to the axle, and an electronic wire shift mechanism and an associated gearshift lever mounted on the upper end of the swing arm, wherein the stow-away vehicle transmission shift system is capable of being pivoting with respect to the drivers seat between a forward in use position and a rearward stowed position.

11 Claims, 3 Drawing Sheets

STOW-AWAY VEHICLE TRANSMISSION SHIFT SYSTEM

CROSS-REFERENCE TO RELATED APPLICATION

The present application claims priority from, and the benefit of the filing date of, U.S. Provisional Patent Application Serial No. 60/119,249, filed Feb. 9, 1999.

BACKGROUND OF THE INVENTION

1. Field of the Invention

The present invention relates to a vehicle transmission shift system.

2. Description of the Background Art

Modern road transportation moves a huge quantity of goods each and every day. Large trucks carry everything from food to flowers, and are moving at all times of the day and night. Although regulations govern the total hours of driving time a driver may put in, many routes require significant transit times, and truck development has had to reflect the needs of the drivers.

As a result of large distances and lengthy highway driving times, many modern trucks include a sleeper. The sleeper allows a truck driver to make long runs without having to incur the expense of renting a room.

A typical truck sleeper is built onto the back of the truck cab, and is a relatively small space in which a mattress or other bed may be found. Access to the sleeper is usually through a space between the driver and passenger seats of the truck.

However, in the related art a gearshift or gearshift console is usually located somewhere in the region between the seats. The gearshift or gearshift console usually extends upward out of the floor, even in trucks having newer powertrains that are electronically shifted or controlled. Therefore, although the gearshift or gearshift console may be in an optimum position for use during driving, it is in a poor position at other times and blocks access to the sleeper, for both the driver and any passenger.

What is needed, therefore, are improvements in vehicle gearshifts.

SUMMARY OF THE INVENTION

A stow-away vehicle transmission shift system adapted to be pivotally mounted adjacent to a drivers seat of said vehicle is provided according to the invention. The stow-away vehicle transmission shift system comprises an axle positioned adjacent to the drivers seat, a swing arm having an upper end and a lower end, with the lower end being pivotally connected to the axle, and an electronic wire shift mechanism and an associated gearshift device mounted on the upper end of the swing arm, wherein the stow-away vehicle transmission shift system is capable of being pivoting with respect to the drivers seat between a forward in-use position and a rearward stowed position.

The above and other features and advantages of the present invention will be further understood from the following description of the preferred embodiments thereof, taken in conjunction with the accompanying drawings.

DETAILED DESCRIPTION OF THE PREFERRED EMBODIMENTS

Figure 1:
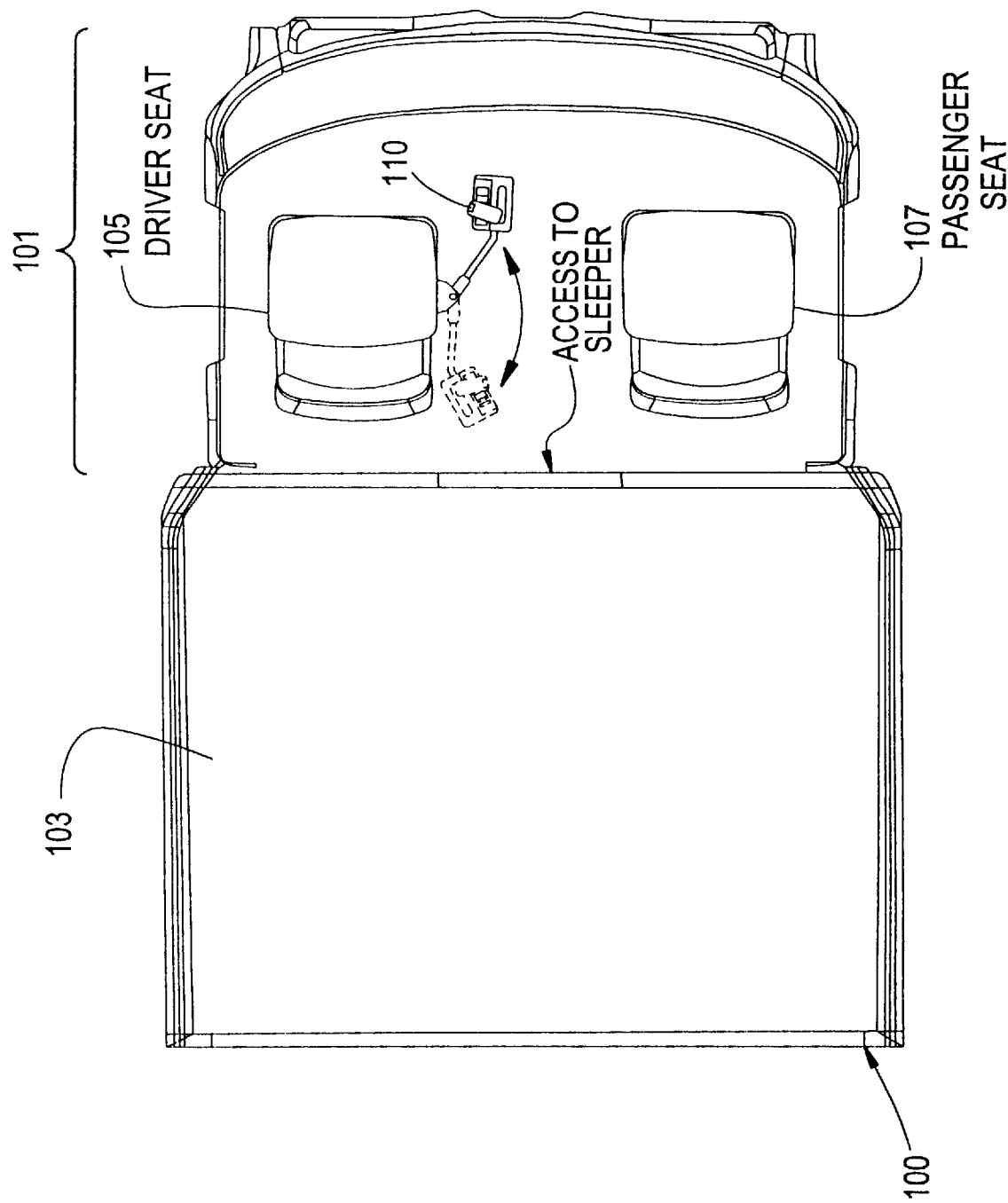
FIG. 1 shows a typical truck having a cab and a sleeper.

FIG. 1 shows a typical truck 100 having a cab 101 and a sleeper 103. The cab 101 includes a drivers seat 105 and a passenger seat 107. The drivers seat 105 includes a stow-away vehicle transmission shift system 110 of the present invention. The figure illustrates how the shift system 110 occupies a forward in use position similar to that of a conventional gearshift or gearshift console. However, the shift system 110 may also be advantageously repositioned to a rearward stowed position, as shown. The stowed position allows easy and unobstructed sleeper access by both the driver and the passenger. In addition, the stowed position may allow easier movement about the cab 101.

Figure 2:
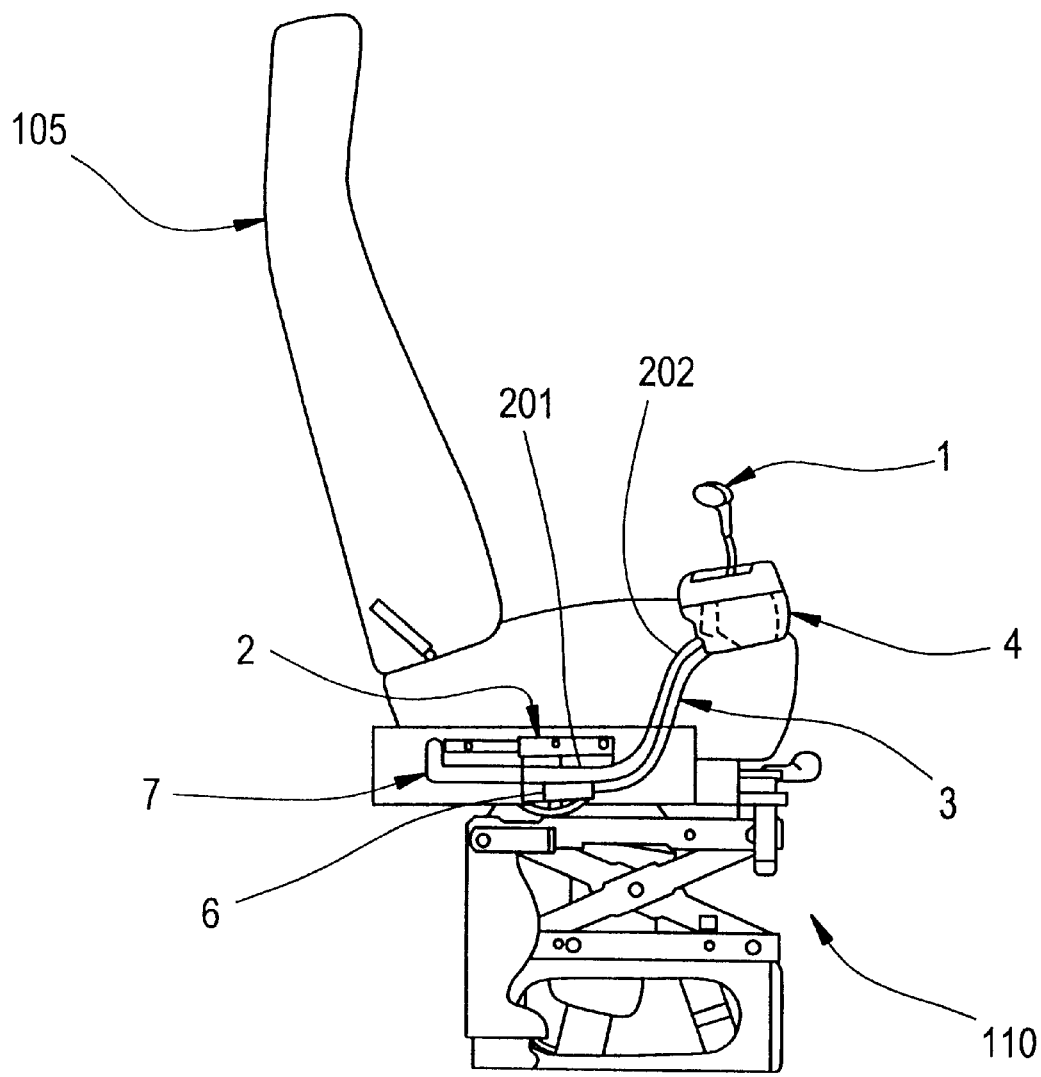
FIG. 2 shows the main components of the stow-away vehicle transmission shift system.

FIG. 2 shows the main components of the stow-away vehicle transmission shift system 110. The shift system 110 includes an electronic wire shift mechanism 4 and associated gearshift lever 1, a swing arm 3, and a pivot mechanism 6 (discussed in greater detail below in conjunction with FIG. 3). The electronic wire shift mechanism 4 is attached to an upper end 202 of the swing arm 3, while the pivot mechanism 6 is attached to a lower end 201 of the swing arm 3. A mounting plate 2 attaches the pivot mechanism 6 to the seat frame 7 of the drivers seat 105.

Because of the pivot mechanism 6, the swing arm 3 can pivot between the forward in use position and the rearward stowed position, and anywhere in between. The shift system 110 therefore may allow the driver to move the shift system 110 as desired, and may allow for personal locational preference.

Figure 3:
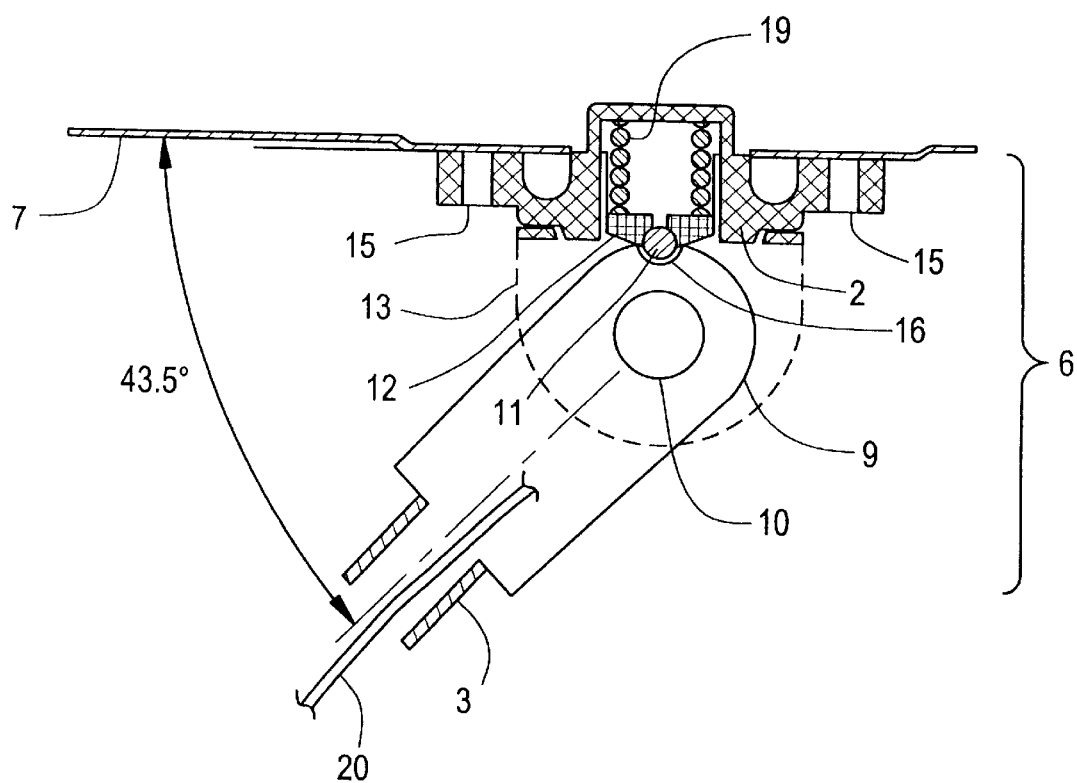
FIG. 3 shows detail of a pivot mechanism of the stow-away vehicle transmission shift system.

FIG. 3 shows detail of the pivot mechanism 6. Although the shift system 110 offers convenience for the truck driver (and passenger), it would be inconvenient if the shift system 110 could move in a completely unrestricted fashion, as the shift system 110 could be constantly swinging due to vibration, road angle, road roughness, etc. Therefore, a positional detent is desirable to hold the shift system 110 in the forward in use position.

The swing arm 3 is pivotally attached to an axle 10, about which the swing arm 3 pivots. The axle 10 is held to the mounting plate 2 by flanges 13. The swing arm 3 further includes a substantially rounded end surface 9 which is used as part of a positional detent. The substantially rounded end surface 9 includes, as part of the positional detent, at least one positional detent groove 16. The at least one positional detent groove 16 is preferably located so that it occurs at the forward in use position, preferably at an angle of about 43.5 degrees away from the side of the drivers seat 105. However, it should be understood that the substantially rounded end surface 9 could include multiple positional detent grooves 16.

The positional detent further includes a positional detent pin 11, a biasing plate 12, and a biasing device 19. The positional detent pin 11 fits substantially within the positional detent groove 16, although the positional detent pin 11 does not have to be the same size as the positional detent groove 16. The biasing plate 12 and the biasing device 19 urge the positional detent pin 11 into the positional detent groove 16. The biasing device 19 in the preferred embodiment is a coil spring, but alternatively other biasing devices may be used, such as a leaf spring, diaphragm, bladder, etc.

The mounting plate 2 also includes mounting holes 15 for use in attaching the mounting plate 2 to the seat frame 7. The mounting may be accomplished through the use of fasteners such as bolts or screws, for example.

The swing arm 3 is preferably substantially hollow, as shown, and electrical wires 20 from the electronic wire shift mechanism 4 may pass down through the substantially hollow interior of the swing arm 3 and exit the swing arm 3 in the region of the axle 10.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A stow-away vehicle transmission shift system adapted to be pivotally mounted adjacent to a drivers seat of said vehicle, comprising:

an axle positioned adjacent to said drivers seat;

a swing arm having an upper end and a lower end, with said lower end being pivotally connected to said axle; and an electronic wire shift mechanism and an associated gearshift device mounted on said upper end of said swing arm;

wherein said stow-away vehicle transmission shift system is capable of pivoting with respect to said drivers seat between a forward in-use position and a rearward stowed position; and wherein said stow-away vehicle transmission shift system includes at least one positional detent.

2. The stow-away vehicle transmission shift system of claim 1, wherein said at least one positional detent is located at a lower end of said swing arm.

3. The stow-away vehicle transmission shift system of claim 1, wherein said at least one positional detent is located at a lower end of said swing arm for said forward in-use position.

4. The stow-away vehicle transmission shift system of claim 1, wherein said at least one positional detent is located at said forward in use position at an angle of about forty-three-and-a-half degrees from said drivers seat.

5. The stow-away vehicle transmission shift system of claim 1, wherein said swing arm is substantially hollow; and wherein one or more electrical wires from said electronic wire shift mechanism pass through said swing arm, exiting said swing arm in a region of said axle.

6. The stow-away vehicle transmission shift system of claim 1, wherein said positional detent comprises:

a substantially rounded end surface on said lower end of said swing arm;

at least one positional detent groove located at a predetermined position on said substantially rounded end surface;

a positional detent pin adapted to fit substantially within said positional detent groove when said swing arm is in a position corresponding to said predetermined position of said at least one positional detent groove; and a biasing device that urges said positional detent pin against said substantially rounded end surface of said swing arm and into said at least one positional detent groove.

7. The stow-away vehicle transmission shift system of claim 6, wherein said biasing device is a spring.

8. The stow-away vehicle transmission shift system of claim 6, wherein said predetermined position of said at least one positional detent groove is at said forward in use position of said stow-away vehicle transmission shift system.

9. The stow-away vehicle transmission shift system of claim 1 wherein said axle is affixed to said drivers seat.

10. The stow-away vehicle transmission shift system of claim 1 wherein said lower end of said swing arm is pivotally attached to said axle.

11. The stow-away vehicle transmission shift system of claim 1 wherein said gear shift device is a gear shift lever mounted on said upper end of said swing arm.

* * * * *